United States Patent [19]

Fleischer et al.

[11] 3,907,380
[45] Sept. 23, 1975

[54] VEHICLE WHEEL ANTI-LOCK APPARATUS TEST SYSTEM

[75] Inventors: Helmut Fleischer, Schwieberdingen;
Helmut Domann, Leonberg;
Wolfgang Maisch, Schwieberdingen;
Eberhard Schnaibel, Hemmingen,
all of Germany

[73] Assignee: Robert Bosch G.m.b.H,
Gerlingen-Schillerhohe, Germany

[22] Filed: Apr. 8, 1974

[21] Appl. No.: 458,821

[30] Foreign Application Priority Data
May 9, 1973 Germany............................ 2323358

[52] U.S. Cl. .......... 303/21 AF; 324/73 R; 340/52 B; 340/410
[51] Int. Cl.² .......................................... B60T 8/08
[58] Field of Search...................... 73/121, 488, 507; 180/105 E; 188/181 C; 303/20, 21 AF, 21 BE, 21 P; 307/10 R; 317/5; 235/150.2, 150.5, 153 A, 153 AC; 324/57 R, 73 R, 160-161; 340/52 B, 53, 410

[56] References Cited
UNITED STATES PATENTS

| | | |
|---|---|---|
| 3,724,903 | 4/1973 | Okamoto et al.................. 303/21 P |
| 3,740,646 | 6/1973 | McMahon, Jr..................... 324/73 R |
| 3,797,893 | 3/1974 | Burckhardt et al.......... 303/21 AF X |
| 3,818,433 | 6/1974 | Okamoto et al............. 303/21 AF X |

*Primary Examiner*—Trygve M. Blix
*Assistant Examiner*—Stephen G. Kunin
*Attorney, Agent, or Firm*—Flynn & Frishauf

[57] ABSTRACT

To test operation of a vehicle wheel anti-lock system, prior to use thereof upon operation of a motor vehicle, a programmed counter is provided and a speed simulation circuit which provides, through logic gates, controlled charging and discharging of a capacitor through the speed simulation circuit, in steps, and under command of the counter to thereby generate a sequence of signals simulating a sequence of vehicle speeds and changes in vehicle speeds, to which threshold switches, responsive to acceleration and deceleration of the wheel, or the vehicle, respectively, can respond as if the vehicle, or the wheel, itself had accelerated and decelerated. If the response is improper, an alarm is provided which can disable the wheel anti-lock apparatus.

24 Claims, 4 Drawing Figures

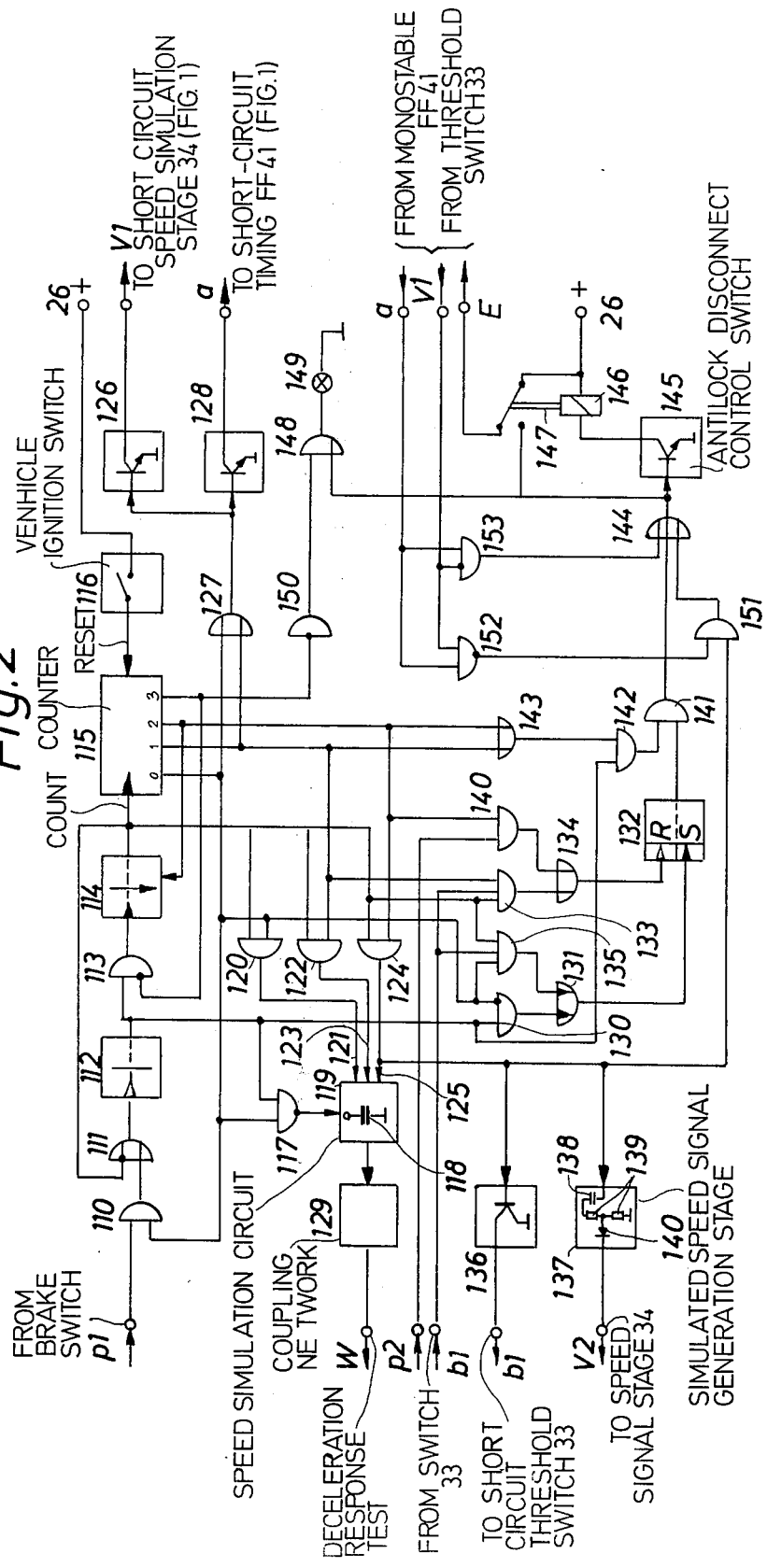

VEHICLE WHEEL ANTI-LOCK APPARATUS TEST SYSTEM

CROSS REFERENCE TO RELATED PATENT

U.S. Pat. No. 3,863,993, filed Sept. 13, 1972, assigned to the assignee of the present application.

The present invention relates to a testing system for vehicle wheel anti-lock apparatus, in which a brake acts, by means of a pressure fluid, on at least one wheel of a vehicle. The vehicle wheels are provided with speed generators which, eventually, control acceleration threshold switches which are logically connected to control pressure rise and pressure drops in the vehicle wheel brake cylinders, in dependence on wheel acceleration, and deceleration, respectively.

If an electronic wheel anti-lock control apparatus malfunctions, braking of the vehicle may result in dangerous conditions. For example, if the malfunction commands a pressure dropping valve to remain open too long, then brake pressure may be completely eliminated, so that one wheel of the vehicle will not be braked anymore at all. Safety circuits have been proposed in which such errors or malfunction can be largely avoided. In one of the known safety or interlock circuits, the opening time of the pressure reducing valve is monitored by means of a timing circuit. The timing circuit monitors the opening time of a pressure dropping valve. If a certain maximum time is exceeded, a switch is activated to control closing of the pressure dropping valve, thus permitting increase in braking pressure in any event after the timing interval.

It may occur that a wheel acceleration sensor provides a retardation or deceleration signal as soon as the valve has been closed. This will again cause opening of the pressure dropping valve, and the wheel anti-lock control system will continue to operate, always with maximum opening period of the dropping valve, and immediate re-opening after closing of the timing interval, so that control cycles including pressure dropping phases and pressure rise phases will result. The driver, in this case, has no way to determine that the anti-lock system does not function properly.

It is an object of the present invention to provide a monitoring circuit to test the operating reliability of a wheel anti-lock system. The driver or operator should have the opportunity, each time before starting movement of the vehicle, to subject the anti-lock system to a test program to determine if all elements of the anti-lock system operate reliably, and as intended.

Subject Matter of the present Invention

Briefly, the test system includes a programmed control unit which has a counter formed, for example, by one or more monostable multi-vibrators. The counter controls a fixed, automatically stepping test program, which simulates signals representative of vehicle and wheel speeds, and wheel speed changes, and rate of change, by selectively charging and discharging a capacitor in a speed simulating stage depending on the test program, by selective connection of the capacitor through logic networks, such as logic gates.

The driver or operator of the vehicle must start the test program, for example by operating the ignition switch of a vehicle and thereafter operating the brake. This starts the test program. An indicator, such as alarm lamp lights. After the test program is terminated, and if it has indicated proper function, the lamp extinguishes, thus indicating to the driver that the wheel anti-lock system operates properly.

Proper response of a wheel anti-lock system which includes acceleration sensing threshold switches is effected, in a preferred embodiment, by providing a bistable flip-flop (FF) having a set input and a reset input. If the test system indicates proper operation of the anti-lock system, the bistable FF is set and reset, over logic gates operated by a pair of monostable FF's in such a manner that a set impulse is followed immediately by a reset impulse. If the wheel anti-lock system does not operate properly, however, for example upon erroneous response of the acceleration threshold stage of the wheel anti-lock system, an additional set impulse is applied over a further logic gate without, however, a reset impulse following. If an acceleration sensing stage does not respond at all, a second capacitor discharge is so evaluated over a logic gate that no reset impulse follows a set impulse. In each case, a signal will be obtained at the output of the bistable FF, which is indicative of an alarm condition.

Various vehicle wheel anti-lock systems include not only acceleration/deceleration sensors, but further slip sensing, that is, they evaluate instantaneous speed of any one of the wheels with respect to vehicle speed. The inout of such a slip stage is applied over a summing or adder circuit to the output of a frequency- d-c converter. The adder circuit then compares wheel speed with vehicle speed, and braking pressure is dropped, over the bleeder or dripping valve, if the speed differential between circumferential wheel speed and vehicle speed is excessive. Further, anti-lock systems have been proposed in which a timing circuit is connected between a threshold switch and the switch controlling current flow to the bleeder or pressure dropping valve. This timing circuit interrupts bleeding of pressurized brake fluid, in any event, even if no reset pulses are provided to stop a pressure dropping phase of the anti-lock system. The minimum timing period of the timing circuit can be tested, if provided in such anti-lock systems, in accordance with a feature of the invention, by connecting the output of the timing circuit over logic gates with a self-holding switch through which current supply to the anti-lock control apparatus can be interrupted. The maximum timing period of the timing circuit can be tested by means of a further logic circuit having an output connected over an OR-gate with the control switch of the system, to indicate if proper, or improper function of the timing circuit has resulted.

The invention will be described by way of example with reference to the accompanying drawings, wherein:

FIG. 2 is a general block circuit diagram of a system in accordance with the present invention;

Figure 1:
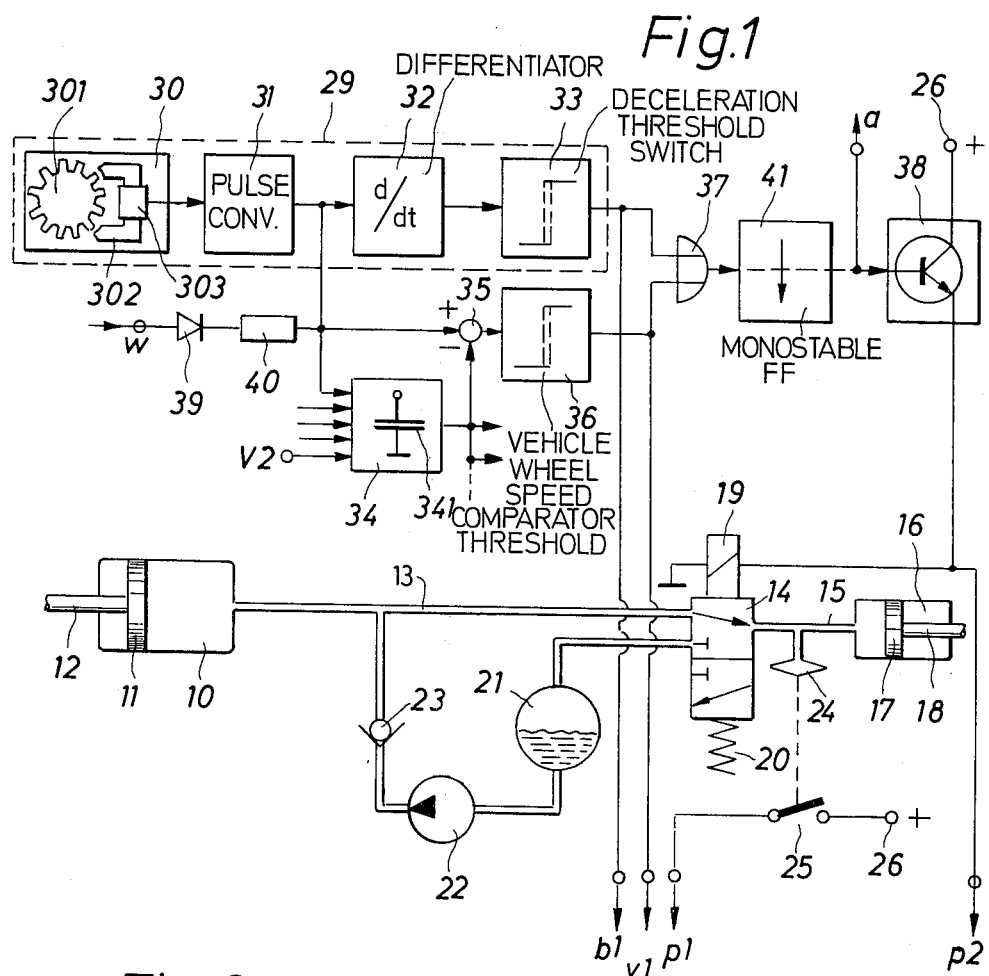
FIG. 1 is a general block circuit diagram of a wheel brake anti-lock system, highly simplified, and schematic.

A wheel brake anti-lock apparatus, with which the system of the present invention can be used, is shown in highly schematic form in FIG. 1. For a discussion of detailed systems of this type, reference is made to cross-referenced U.S. Pat. No. 3,863,993, assigned to the assignee of the present invention. A master brake cylinder 10, having a piston 11, operated by an operating rod 12, connected, for example, to a brake pedal, provides hydraulic fluid to a three terminal, or three-way - two-position pressure/bleeding valve 14, which has an electric control winding 19. Pressurized brake fluid is derived from a sump 21, pumped by pump 22 over a check valve 23 into a pressure line 13, to be there applied through valve 14, selectively, to brake line 15 to operate brake piston 17 in brake cylinder 16, by means of brake operating rod 18. The showing is schematic; two separate valves may be used rather than one three/two valve. A diaphragm 24 operates, by sensing pressure, switch 25, connected to a source of positive potential 26 which is connected to terminal $p1$, and to a suitable brake indicator light. Valve 14 is retained in its quiescent position, as shown in FIG. 1, by means of a spring 20. If winding 19 is energized, connection is established between wheel brake cylinder 16, that is, wheel brake line 15 and the return to sump 21. Fluid communication from master brake cylinder 10 is then interrupted.

Winding 19 of the pressure control valve 14 is controlled by a wheel anti-lock system which is shown in FIG. 1, in highly schematic form. A wheel acceleration sensor 29 is provided, which includes, generally, a pulse source 30, providing pulses in synchronism with wheel rotation, a pulse converter or frequency-d-c voltage converter 31, a differentiator 32, and an acceleration threshold sensor 33, formed, ususally, as an acceleration threshold switch. The output of the frequency - d-c converter 31 is further connected to an adder or summing circuit 35. Adder and summing circuit 35 has its output connected to a difference threshold sensing circuit 36. The output of the frequency-d-c converter 31 is additionally connected to a wheel speed simulation stage 34, which includes a storage capacitor 341. A terminal V2 is connected to one input of the wheel speed simulation stage 34. Other inputs of the wheel speed simulation stage are connected to the frequency - d-c converters of the other vehicle wheels. Further outputs of the wheel speed simulation stage 34 are, further, connected to other adders 35 of the anti-lock systems associated with other wheels of the vehicle. A terminal w is connected over the series circuit including a diode 39 and a resistor 40 with the output of the frequency - d-c converter 31.

The outputs of the two threshold circuits 33, 36 are connected to two inputs of a first OR-gate 37, the output of which is connected over a monostable FF 41 with the control input of a switch 38, shown as a switching transistor. The collector terminal of the switching transistor 38 is connected to positive bus 26; the emitter terminal is connected to the solenoid winding 19 of valve 14, the other terminal of which is grounded. A terminal a is connected to the output of the monostable FF 41.

Pulse source 30 includes a star wheel 301, coupled or driven by the vehicle wheel. Star wheel 301 has ferromagnetic teeth which pass by a yoke 302 on which a coil 303 is wound. Upon rotation of star wheel 301, the magnetic reluctance path formed by yoke 302 and star wheel 301 changes, and a-c pulses are induced in coil 303. The frequency of the pulses is proportional to the speed of the wheel, and hence to the circumferential speed of the vehicle wheel.

The output pulses of the pulse source 30 are converted into a d-c voltage in pulse converter 31. In its simplest case, the pulse converter 31 is a low-pass filter which provides a d-c voltage representative of wheel circumferential speed. Storage capacitor 341 in the vehicle simulation stage 34 is charged to a voltage from the various frequency d-c voltage converters 31, or from the input V2 to a value which is representative of circumferential speed of that wheel which turns fastest. Under the assumption that at least one of the vehicle wheels is not blocked, a fairly accurate simulation of true vehicle speed is obtained.

Upon blocking of the specific wheel to which the pulse source 30 is connected, the output voltage of the frequency - d-c converter 31 drops rapidly. Differentiator 32 provides a negative output signal which causes the first threshold switch 33 to respond. If the deceleration of the wheel is not so great that the first threshold switch 33 responds, but if the wheel speed changes to a value which is quite low with respect to that of the vehicle as a whole, summing or adder circuit 35, together with the second threshold switch 36 determine that the difference between circumferential wheel speed of the respective wheels and vehicle speed (as determined by the highest circumferential wheel speed) exceeds a predetermined threshold and then the speed comparison stage 36 will respond. Various other threshold switches, responding to selected values of wheel deceleration or acceleration can be used, and reference is made to the co-pending U.S. Pat. No. 3,863,993, assigned to the assignee of the present application.

The invention will be explained in connection with notation customary in digital techology. A 1-signal may be defined as a line or junction which has a positive voltage applied thereto, for example approximately the value of terminal 26; a 0-signal has zero potential, that is, effectively, ground or chassis potential.

The two threshold switches 33, 36 are so designed that they provide 0-signals in quiescent conditions. In this case, only, OR-gate 37 provides a 0-signal which blocks transistor 38, since monostable FF 41 will not change stage. As soon as at least one of the threshold switches 33, 36 responds, and provides a 1-signal, the output of OR-gate 37 provides a 1-signal which triggers monostable FF 41, supplying transistor 38. During the unstable time of the monostable FF 41, winding 19 of the valve 14 is supplied with current through transistor 38. This changes over the state of the valve 14 and pressurized brake fluid can flow from the valve cylinder 16 into sump 21, while connection of pressurized brake fluid from pressure line 13 and hence the brake cylinder 10 is interrupted. Braking pressure will thus drop. This drop in braking pressure will persist until the vehicle wheel is no longer excessively decelerated, that is, until its circumferential speed has approached the speed of the vehicle. The timing of monostable FF 41 is so set that it is constantly triggered, or held in changed state. When the two threshold switches 33, 36 revert to their quiescent position, monostable FF 41, and hence transistor 38 are again blocked. The cyclical change of pressure drop and pressure rise repeats periodically. The anti-lock control system thus sets an average braking pressure which provides optimum braking of the vehicle wheel without blocking.

In case all the vehicle wheels should be blocked simultaneously, so that no wheel speed can be measured anymore, the storage capacitor 341 is discharged gradually by a discharge circuit included in the speed simulation stage 34. Discharge is preferably controlled to simulate a vehicle deceleration of 1 g, which corresponds, from experience, roughly to effective braking. On a smooth road, the situation may arise that storage capacitor 341 discharges more rapidly than would be the case if actual vehicle speed were measured by its discharge rate. This does not interfere with operation, however, since in this case the deceleration control effected by the differentiator 32 and the threshold switch 33 provides for reliable response in order to continue bleeding of brake fluid from the wheel brake cylinder, and thus decrease of brake pressure.

The example illustrated in FIG. 1 uses a hydraulic braking system with a sump 21 and a supply pump 22. The anti-lock control system in accordance with FIG. 1, as well as the test system of the present invention to test operation of an anti-lock apparatus, may be used also with pressure control valves using pneumatic braking pressures. Pneumatic systems are not operated with a closed pressure fluid (sump 21 and pump 22) but rather compressed air is released to atmosphere directly from the valve 14.

An example of a circuit to test the operating reliability of an anti-lock system is shown in FIG. 2. Terminals $a$, $b1$, $v1$, $p1$, $p2$, $v2$ and $w$ are connected to similarly labelled terminals in FIG. 1. The terminal $b1$ is the output terminal of the first threshold switch 33, terminal $v1$ is the output terminal of the second threshold switch 36. Terminal E supplies operating power to the anti-lock system.

The test system includes a program control unit which, essentially, includes two monostable flip-flops 112, 114, a four-stage counter 115, and a logic gate circuit including a first logic AND-gate 110, and a first OR-gate 111, and a second logic AND-gate 113. The elements are connected in series as shown in FIG. 2, and the output of second FF 114 is fed back to a negative input of OR-gate 111.

Upon operation of the main ON switch 116 of the vehicle, for example coupled to the ignition switch, counter 115 is set to zero state, that is, the zero-output now has a 1-signal appear thereat. The zero-output is connected to a an input of the first AND-gate 110; the second input of AND-gate 110 is connected to terminal $p1$ of the brake switch 25. Upon operation of the brake, the brake switch 25 will close and the output of the first AND-gate 110, and thus one input of the first OR-gate 111 will have a 1-signal thereat which triggers the first monostable FF 112. The second AND-gate has a second input which inverts, and is connected to the output of count 3 of counter 115. The second FF 114 is triggered by the return flank of the signal of the first monostable FF 112 and, upon triggering of FF 114, counter 115 is stepped by one count, so that output stage 1 now will have a 1-signal appear thereat. Additionally, the output from FF 114 is fed back to the inverting input of the first OR-gate 111 which again triggers monostable FF 112 once more. This repetitive triggering of the monostable FF's 112, 114 continues, as seen in the pulse diagram of FIG. 4, which shows the pulses at lines corresponding to the reference numerals in FIG. 2, and in which the first four lines correspond to the pulse counts of the outputs from the stages 0–3 of counter 115. This cyclical repetition continues until the 1-signal is connected to the output 3 of the counter 115. This signal blocks the inverting input of the second AND-gate 113 so that the second monostable FF 114 cannot be triggered again.

Figure 4:
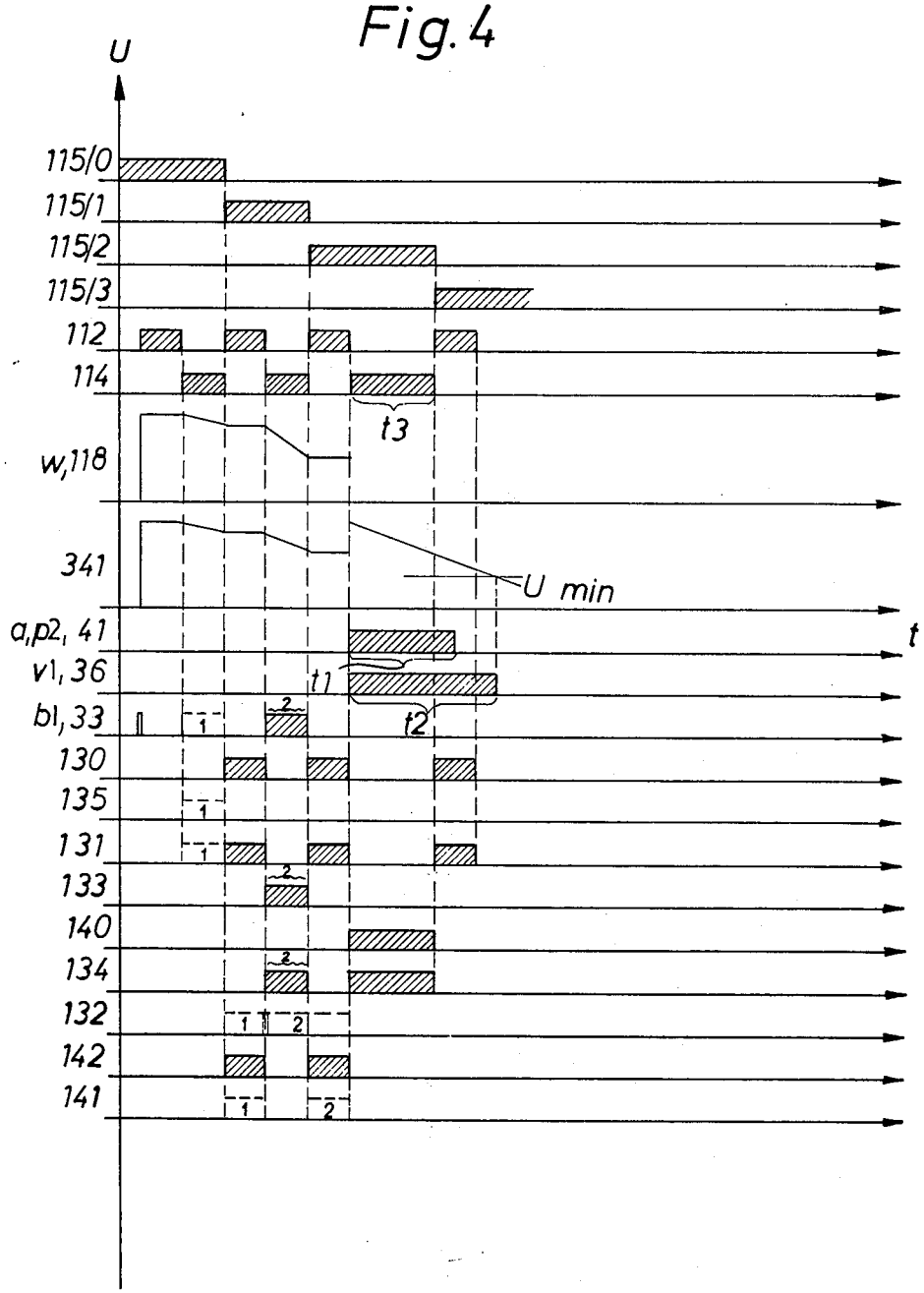
FIG. 4 is a timing diagram illustrating the operation of the system of the present invention.

The 1-signal at output of count stage 2 of counter 115 (generated before the counter has reached the 3-count stage) is applied over a further input to the second monostable FF 114 in order to change the unstable or holding time of FF 114 to a greater time duration (see FIG. 4, line 115/2). A third AND-gate 117, having inputs connected to the output of the zero stage of counter 115 as well as to the output of the first FF 112, has an inverting output which rapidly charges a capacitor 118 in a speed simulation stage 119, at the time of triggering of the first monostable FF 112. A fourth AND-gate 120, having inputs connected to the zero-stage of the counter 115 as well as to the output of the second FF 114, controls discharge of capacitor 118, through terminal 121 to stage 119. This discharge occurs during the first unstable period of the second monostable 114, and is slow, so that the discharge drop is flat. During the second unstable period of the second FF 114, capacitor 118 is also discharged, but more rapidly. The steeper discharge curve slope is controlled by a fifth AND-gate 122, having an input connected to the first stage of counter 115 as well as to the output of the second monostable FF 114. The output of the AND-gate 122 is connected to a control terminal input 123 of the speed simulation stage 119. The third unstable time period of the second monostable FF 114 controls capacitor 118 through a sixth AND-gate 124 for rapid, sudden discharge of the capacitor. The inputs to the sixth AND-gate 124 connected with the stage 2 of counter 115 as well as to the output of the second monostable FF 114. The output of AND-gate 124 is connected to a further input 125 of the speed simulation stage 119.

The test program first tests for proper response of the deceleration threshold switch 33. To prevent possible interfering response of the speed difference stage 36, the output thereof if short-circuited over the terminal $v1$ by short-circuiting a short circuit switch 126, that is, by controlling a transistor in switch 126 to be conductive. The short circuit switch 126 is controlled by a second OR-gate 127 by means of signals applied from output stages zero and one of counter 115. OR-gate 127 also controls a second short-circuit switch 128 through which the output of the FF 41 (FIG. 1) can be short-circuited over terminal $a$.

The voltage applied to capacitor 118 is applied to the input of differentiator 32 over a de-coupling network which includes a de-coupling stage 29, preferably connected as an emitter-follower transistor, which connects to terminal $w$. Terminal $w$ is connected to diode 39 and to a resistor 40, which, then connect to the differentiator 32 and to the speed simulation stage 34, respectively. The capacitor 341 is suitably charged at that time, but this charge of the capacitor is irrelevant for the test program. The first discharge curve of the capacitor 118, as has been stated, is flat. During this discharge rate, the first threshold switch must not respond. The threshold switch 33 must, however, respond during the second steep discharge rate. Upon response of the threshold switch 33, a signal will appear at terminal $b1$. The signal from threshold switch 33 is evaluated in two AND-gates 133 and 135, to determine if a signal is present when it should not be present, or if no signal is present when there should be a signal present, based on the proper simulated input.

A seventh AND-gate 130 has one input connected to the output of the first FF 112, and a second, inverting input to the zero stage of counter 115. The output of the seventh AND-gate 130 is connected to a third OR-gate 131 having dynamic inputs, the output of which is connected to the set input of a bistable switch 132. The set input is triggered by the trailing flank of the signal applied thereto. The output of the seventh AND-gate 130 has a signal applied thereto which corresponds to the second timing period of the FF 112. The trailing flank of this signal would trigger the set input of the bistable switch 132, unless the switch is disabled if a reset signal is simultaneously applied to the reset input of the bistable switch 132. This reset signal is generated by an eighth AND-gate 133 (to evaluate the $b1$ signal). The eighth AND-gate 133 has three inputs. One input is connected to the output of the second FF 114; another input to terminal $b1$; and one input to the count stage 1 of counter 115. The output is connected over a fourth OR-gate 134 to the reset input of FF 132. The signal at the output of the eighth AND-gate 133 will thus occur only when, simultaneously with the second timing period of the second FF 114, the acceleration sensor 33 provides a signal. Since the reset input of the bistable FF 132 is triggered by the leading flank of a signal, the first set signal is thus annulled, and the bistable switch or FF 132 will have no output. If switch 132 would provide an output, the current supply to the wheel anti-lock system would be interrupted, so as to disable the anti-lock system and a warning lamp would indicate malfunction. This will be described below.

In case of initial malfunction, the acceleration threshold stage 33 might respond already during the first, slow discharge of capacitor 118 simulating only slight deceleration. These error pulses are illustrated by dashed pulse indications in FIG. 4, and have been given the reference 1. A ninth OR-gate 135 — forming part of the evaluation circuit — has three inputs. One input is connected to terminal $b1$ of the switch 33; another to the output of the second FF 114 and a third to the zero (0) count stage of counter 115. The output of AND-gate 135 is connected to second dynamic input of the third OR-gate 131. The ninth AND-gate 135 provides an additional set pulse during the duration of the first, gradual discharge of capacitor 118, connected over OR-gate 131, which does not have a following reset pulse. This, then, provides a signal at the output of the bistable switch 132.

Of course, if the deceleration threshold switch 33 has not responded (proper functioning), no signal would have been applied to the set input.

In case of malfunction during the second test of the deceleration threshold stage, that is, if no signal is derived illustrative of high deceleration rate (steep discharge curve of capacitor 118), pulses marked as pulses 2 in the diagram of FIG. 4 will be generated, or missing, respectively. The pulses which will be missing, in case of malfunction, are indicated in FIG. 4 by a wavy line with numeral 2 above the pulse markings. Upon absence of a signal during the discharge simulating high wheel deceleration, the eighth AND-gate 133 will block (no signal from $b1$), so that no reset pulse will be applied to the bistable switch 132, which will then set.

If the switch 132 is set by a set signal, an output will be derived therefrom, to be applied to an AND-gate 141, otherwise controlled by a suitable logic circuit through the FF's 112, 114 and the counting stage of the counter.

The further test program controls response of the pressure control valve 14. A third short circuit switch 136 short-circuits the output of the deceleration threshold switch 33. Switch 136 is controlled from the sixth AND-gate 124, simultaneously with the time period during which capacitor 118 is suddenly discharged. Simultaneously, also, the capacitor 341 in the speed simulation stage 34 (FIG. 1) is charged over a speed simulation signal generating stage 137 and terminal v2. The simulated speed signal generation stage 137 preferably includes a series circuit comprising a capacitor 138, a voltage divider 139 connected to chassis, and a diode 140 connected to the tap point of the voltage divider to provide a suitable output voltage to charge the capacitor 341 to a value which simulates a predetermined vehicle speed. The simulated speed signal generation stage 137 is controlled by the output from the sixth AND-gate 124. The summing circuit 35 now will determine a speed difference, and the vehicle/wheel speed comparison threshold switch 36 will respond. This applies current to the solenoid 19 of the pressure valve 14, and a signal will be applied to terminal $p2$. Terminal $p2$ is connected to an input of a tenth AND-gate 140. The other input of the tenth AND-gate 140 is connected to the output of stage 2 of counter 115. The signal at the output of the tenth AND-gate 140 is applied over the fourth OR-gate 134 to the reset terminal of the bistable switch 132. The signal, due to voltage applied to the solenoid winding 19, is needed as a reset signal in order to compensate a previously generated set signal, obtained over the seventh OR-gate 130. If there is no voltage on the winding 19, no signal will be applied to the switch 32 to cause its resetting, thus disabling the wheel anti-lock control system, and providing an alarm indication.

The output of the bistable switch 132 is connected to the input of an eleventh AND-gate 141. The second input of the AND-gate 141 is connected to the output of a twelfth AND-gate 142. One input of the twelfth AND-gate 142 is connected to the output of the first FF 112; the other input is connected to the output of the fifth AND-gate 143. The two inputs of the OR-gate 143 are connected to the outputs of count stages 1 and 2 of the counter 115. The twelfth AND-gate 142 thus will have a signal if, during the counting stages 1 and 2 of counter 115, a signal occurs at the output of the first FF 112, that is, during the third and fourth switching periods of the FF 112. If, then, simultaneously a signal is generated at the output of the bistable switch 132, the eleventh AND-gate 141 will indicate malfunction. Such a malfunction or trouble signal is applied over a sixth OR-gate 144 to the control input of a short circuit switch 145. Upon energization of the fourth short circuit switch 145, current is connected from terminal 26 over the winding 146 of a relay 147 which responds. In quiescent condition, terminal 26 is connected over the switching contact of relay 147 with a terminal E which supplies current to the anti-lock system. Upon operation of the relay 26, due to operation of the short circuit switch 145, relay 26 changes over, and connects to the control input of the short circuit switch 145 in a well-known holding circuit, so that the relay coil 146 remains energized, and relay 147 is held in the energized position. Current supply to the wheel anti-lock system is interrupted, and the system is disabled.

The input to the fourth short circuit switch 145 is additionally connected over a seventh OR-gate 148 with a control indicator 149, typically an indicator lamp. Upon response of relay 147, lamp 149 lights and remains lit until the main switch 116 is broken. Th seventh OR-gate 148 is further controlled by the output of count stage 3 of counter 115, connected through an inverter stage 150. Thus, the lamp 149 is connected at the beginning of the test program — if there is no error — and then extinguishes after count stage 3 has been reached. First lighting of the lamp indicates proper operation of the lamp, and its subsequent extinction indicates that the wheel anti-lock system operates properly, thus giving an indication not only of operation of the anti-lock system, but also of proper operation of the test program and the test apparatus.

The test program continues to test for proper timing of the timing period $t1$ of the monostable FF 41 (FIG. 1), as well as the discharge period of the capacitor 341 by the discharge circuit therefor included in the speed simulation stage 34. The time after the capacitor 341 receives a definite charge until it has reached a certain predetermined low value $U_{min}$ is defined as $t2$. When the value $U_{min}$ is reached, the difference comparison threshold switch 36 should disconnect. The time when the capacitor 341 is definitely charged to a predetermined value is determined by the charge time of capacitor 341 as controlled from the simulated speed signal generation stage 137 (FIG. 2). A certain minimum comparison time $t3$ is used which corresponds to the extended third holding period of the second FF 114. The signal of the second FF 114 — extended — is derived from the output of the sixth AND-gate 124 and applied to an input of a thirteenth AND-gate 151, the second input of which is connected to the inverted output of a fourteenth AND-gate 152. The fourteenth AND-gate 152 has its inputs connected to terminals $a$ and $v1$, to which signals corresponding to the time periods $t1$ and $t2$ are applied. If, thus, during the time period $t3$ one or the other of the signals associated with the time periods $t1$ and $t2$ drops out, the thirteenth AND-gate 151 will indicate a malfunction, that is, will have a malfunction signal applied thereat, which is connected to the sixth OR-gate 144, thus, again, commanding a malfunction or error signal. This error signal will arise if, either, the holding time of the monostable FF 41 (FIG. 1) or the discharge time of the capacitor 34 is below the minimum time $t3$. The test program, also, tests that $t2$ is longer than $t1$. In order to provide an error signal, if this should not be the case, a fifteenth AND-gate 153 is provided having an output connected to the sixth OR-gate 144. The fifteenth AND-gate 153 has an inverting input connected to terminal $v1$ and a second input to the terminal $a$.

The test apparatus, as described, is provided to test the anti-lock system for one wheel, and may be arranged for a single vehicle wheel. It may, easily, be expanded to test the anti-lock system for a number of wheels, without multiplying all the components. For example, the electronic components for the test program, the control lamp, the turn-off relay 146, 147 for the current supply are needed only once. The decoupling stage 129, alone, must have a plurality of outputs corresponding to vehicle wheels; the sixth OR-gate 144 must have a suitably increased number of inputs. The test system can be used connected into a vehicle and part thereof, or as a separate test apparatus, for use in garages or shops and occasional tests on the system, upon vehicle maintenance.

Figure 3:
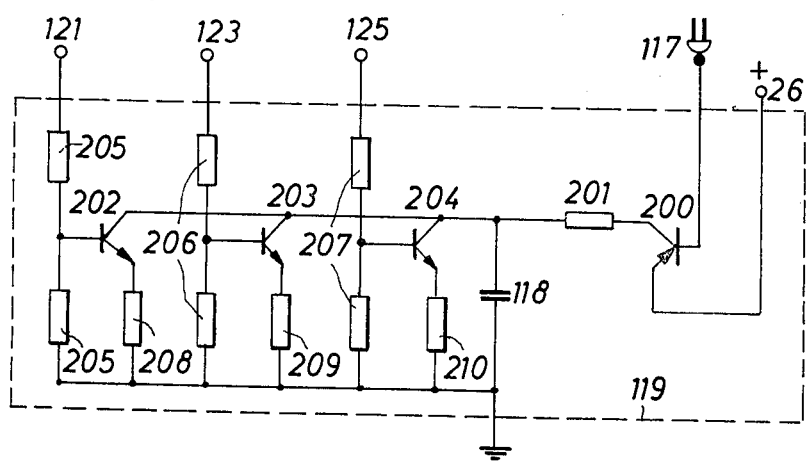
FIG. 3 is a detailed circuit diagram of a speed simulation stage.

FIG. 3 illustrates a circuit diagram of stage 119 which simulates speed signals. The inverting output from the third AND-gate causes the pnp transistor 200 to become conductive, and capacitor 118 is charged from source 26 over a charging resistor 201 and the emitter-collector path of the transistor 200. Resistor 201 is very low, that is, is so dimensioned that the charge occurs rapidly, or suddenly. Three almost identical discharge circuits are connected in parallel to the charge circuit. The first discharge circuit applies a signal from terminal 121 over a voltage divider formed of resistors 205, 205 to the base of an npn transistor 202. The transistor then becomes conductive and discharges capacitor 118 through the emitter-collector path of transistor 202 and the current-limiting resistor 208. The other two discharge stages associated with the inputs 123, 125, are similarly constructed, and include voltage dividers 206, 206; 207, 207; and discharge resistors 209, 210, respectively. The three discharge stages differ only in the value of the resistors connected to the emitter-collector path of the transistors 202, 203, 204, respectively. To obtain a flat discharge slope (slow discharge time, corresponding to small wheel rate of change of speed, for example deceleration), resistor 208 has a high value. The output 123 commands a steeper discharge slope, or a more rapid discharge rate; current-limiting resistor 209, therefore, has a lower value than the resistor 208. Sudden, rapid discharge of the capacitor 118 is controlled over input 125; resistance 210, accordingly, will have a very low value only.

Various changes and modifications may be made within the scope of the inventive concept. Some anti-lock systems have a plurality of threshold switches corresponding to threshold switch 33; to test such different threshold switches, the test program can readily be expanded by including a counter with a greater number of count stages, and a simulation stage 119 which provides a greater number of discharge circuits or, alternatively, a larger number of speed simulation stages can be provided.

We claim:
1. A vehicle wheel anti-lock apparatus test system for use with and adapted for connection to a wheel anti-lock apparatus having a pressure fluid operated brake (16, 17, 18), means (29) including a threshold switch (33) providing a wheel deceleration signal representative of rate of change of wheel speed in excess of a predetermined value;

and a controlled switch means (38) connected to and controlling operation of a valve (14, 19) in a pressure fluid circuit of the brake, to control brake fluid pressure in the brake, said test system comprising
a programmed counter (115);
two monostable flip-flops (FF) (112, 114) controlling stepping of the counter (115);
a capacitor (118);
a speed simulation circuit (119) and a logic circuit including logic gates (117, 120, 122, 124) controlling charging and discharging of the capacitor (118) through said speed simulation circuit (119), in steps, under command and control of the counter (115) to thereby generate a sequence of signals simulating a sequence of vehicle speeds and changes in vehicle speeds for testing the operation of said anti-lock apparatus has been added after "speeds".

2. The system according to claim 1, wherein one of the monostable FF's is connected such that the output of one monostable FF (112) controls the output of the second FF (114), and vice versa, the output of the second FF (114) controlling stepping of the counter by a count.

3. The system according to claim 1, comprising a control indicator (149) connected to the highest count stage (3) of the counter (115), said indicator being energized upon energization of said test system and upon the counter reaching the highest count (3) and being de-energized thereby if
 a. the count of the counter has reached the highest count, and
 b. if the highest stage of the count has been reached, the apparatus is functioning properly.

4. The system according to claim 3, further comprising logic gate means (148, 150) connecting the highest count stage of the counter (115) with the indicator (149) to extinguish the indicator when the highest count is reached.

5. The system according to claim 1, further comprising a logic gate (113) connecting the highest count stage (3) of the counter to the second monostable FF (114) to disable the second monostable FF when the highest count of the counter is reached to thereby terminate the test program and inhibit continued recycling of the counter.

6. The system according to claim 1, wherein said simulation circuit (119) comprises
 a charge circuit (FIG. 3: 200, 201) for the capacitor (118) and at least one discharge circuit (202, 205, 208; 203, 206, 209; 204, 207, 210) for the capacitor, said charge and discharge circuits being selectively enabled by said logic circuit (117; 120, 122, 124) in dependence on the test program.

7. The system according to claim 6, wherein at least two discharge circuits for the capacitor (118) are provided;
 the first discharge circuit discharging the capacitor at a rate representative of a simulated change in vehicle speed which is below the response threshold of the threshold switch (33) and the second discharge circuit discharging the capacitor (118) at at rate representative of simulated change in vehicle speed which is above the response threshold of said threshold switch (33).

8. The system according to claim 7, further comprising two monostable flip-flops (FF) (112, 114) controlling stepping of the counter;
 wherein the first discharge circuit is activated during a first timing period of one of the flip-flops (114) and the second discharge circuit is activated during a second timing period of said one flip-flop (14).

9. The system according to claim 8, further comprising a bistable switch (132);
 a logic gate circuit (130, 131, 133, 140, 134);
 and means connecting said bistable flip-flop, said logic gate circuit and said two monostable FF's (112, 114) to to sequentially apply set pulses to the bistable switch followed immediately by reset pulses cancelling the effect of the set pulse, said logic circuit being connected such that, if the threshold switch does not respond properly upon discharge through the first discharge circuit, a subsequent set impulse is applied to the set input, without a following reset pulse, said bistable switch then changing state to indicate malfunction;
 said logic circuit being further connected such that if, upon improper response of the threshold switch (33) during discharge of the capacitor through the second discharge circuit, connection of a reset pulse to said bistable switch is inhibited so that said bistable switch will provide a signal at the output thereof indicative of malfunction if
 a. the threshold switch responds when a signal indicative of low rate of change is applied thereto, that is, when it should not respond; or
 b. the threshold switch does not respond when a signal indicative of high rate of change of speed is applied thereto, that is, when it should respond.

10. The system according to claim 9, further comprising an anti-lock apparatus operating switch (147) controlled by the output signal from the switching stage (132) to interrupt current supply to the anti-lock system if the switching stage (132) is placed in a state indicative of malfunction of the anti-lock system.

11. The system according to claim 10, wherein the anti-lock operation switch (147) is a self-holding switch.

12. The system according to claim 11, wherein the anti-lock operation switch (147) includes a self-holding contact, and a logic gate (148) connecting the self-holding contact to the indicator (149).

13. The system according to claim 1, further comprising short circuit switch means (126) connected to short-circuit at least a portion of the vehicle anti-lock apparatus during part of the test program and while said portion is not being tested.

14. The system of claim 1, in combination with an automotive vehicle having the wheel anti-lock apparatus.

15. The system according to claim 1, further comprising means connecting the sequence of signals, sequentially, to the wheel anti-lock apparatus;
 logic circuit means evaluating the responses of the components of the anti-lock apparatus to said sequentially applied simulating signals;
 and means (149) indicating if the response of the apparatus to said simulated signals is proper, or improper.

16. The system according to claim 15, wherein the logic means evaluating the response of the anti-lock apparatus includes timing means establishing predetermined time periods and testing the response of at least some of the components of the anti-lock apparatus with respect to respective time periods.

17. A vehicle wheel anti-lock apparatus test system for use with and adapted for connection to a wheel anti-lock apparatus having a pressure fluid operated brake (16, 17, 18), means (29) including a threshold switch (33) providing a wheel deceleration signal representative of rate of change of wheel speed;
 a controlled switch means (38) connected to and controlling operation of a valve (14, 19) in a pressure fluid circuit of the brake, to control brake fluid pressure in the brake, said test system comprising
 a programmed counter (115);
 a capacitor (118);
 a speed simulation circuit (119) and a logic circuit, including logic gates (117, 120, 122, 124) controlling charging and discharging of the capacitor (118) through said speed simulation circuit (119), in steps, under command and control of the counter (115) to thereby generate a sequence of signals simulating a sequence of vehicle speeds and changes in vehicle speeds;

and a speed comparator stage having an adder circuit (35) and providing an output signal representative of comparison between circumferential speed of any wheel of the vehicle with the highest circumferential speed of all the wheels of the vehicle, said system further including a speed simulation signal generating means (137) connectable through a logic gate (124) of the logic circuit to the adder circuit (35), said speed simulation signal generating means providing an output signal simulating a speed signal which is above the threshold value effecting comparison of said circumferential wheel speed and highest wheel speed, causing response of the control valve (14) of the brake system;

the logic circuit including logic gates (140, 134) logically testing energization of the pressure control valve (14) and of the speed comparator threshold stage (36), said logic gates being connected to provide a signal indicative of proper, or improper energization of said valve, and operation of said difference threshold switch.

18. The system according to claim 17, wherein the speed simulation signal is applied to the adder stage (35) after the test program testing for changes in the vehicle speed has been completed.

19. The system according to claim 18, further comprising a bistable switch (132), the state of said switch indicating whether the test of the system shows proper or improper operation;

the logic gates (140, 134) being connected to said bistable switch (132).

20. The system according to claim 19, wherein the logic gates (151, 152) test for minimum time of persistence of a signal from the speed comparator stage (36), the signal from said stage (36) being applied to an input of the logic gates, said logic gates providing an "error" output signal if, during the duration that said logic gates have a signal applied by at least one of said monostable FF's (12, 14), the signal from the speed comparison stage (36) is absent.

21. The system according to claim 17, in which the anti-lock apparatus further includes a timing circuit (41) connected between the threshold switch (33) and the valve (14, 19);

said system further comprising two monostable flip-flops (112, 114) controlling the stepping of the counter;

and wherein the test circuit further includes logic gates (151, 152) to test minimum timing of the timing circuit (41), said logic gates effecting comparison of a signal from the timing circuit (41) as well as a signal from at least one of said FF's (14), the output of the logic circuit being indicative if, during the duration of a signal from said at least one FF (14), a signal is derived from the timing circuit.

22. The system according to claim 17, in which the wheel anti-lock system has an additional timing circuit included between the threshold switch;

wherein the test circuit includes two monostable flip-flops (FF) (112, 114) controlling stepping of the counter and at least one logic gate, and wherein, to test for maximum time duration of the timing ciruit, a logic gate (153) is provided, the output of which logic gate (153) is connected through the logic circuit (OR-gate 144) with the main control switch (147) of the wheel anti-lock apparatus;

the logic gate (153) having a signal from said timing circuit (41) applied thereto and a signal of predetermined length from the speed comparator stage (36), the output of the signal from the logic gate (153) providing a "malfunction" signal if, during the duration of the timing signal, the speed comparator stage (36) does not provide a signal.

23. The system according to claim 17, further comprising a short circuit switch (126) short-circuiting the output of the speed comparator stage (36) during testing of the deceleration/acceleration threshold switch (33) and the means providing a wheel deceleration/acceleration signal.

24. The system according to claim 17, further comprising a short circuit switch (128) connected to short-circuit the output of the means providing a wheel deceleration/acceleration signal during the time when the speed comparator stage is being tested.

* * * * *